Patented Oct. 20, 1931

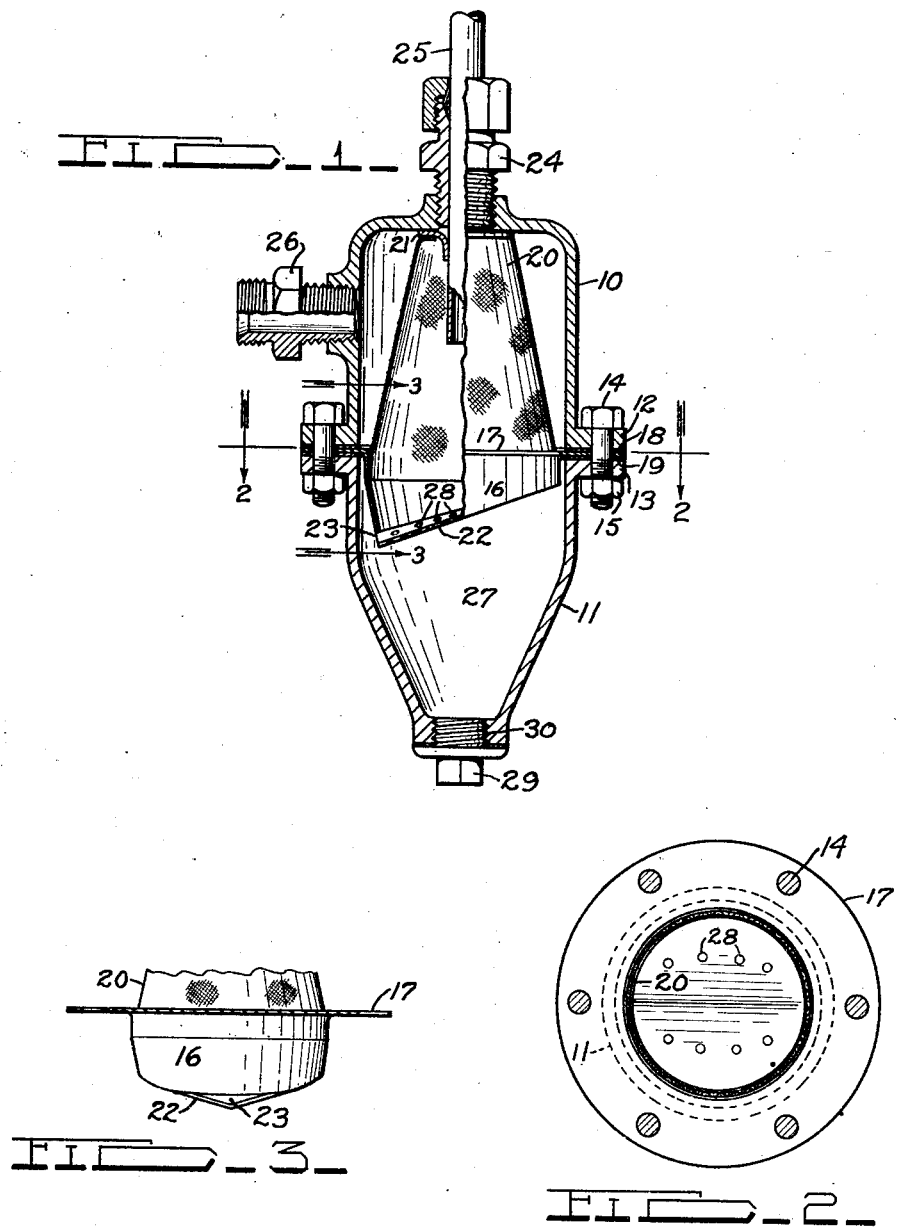

1,828,484

UNITED STATES PATENT OFFICE

BENJAMIN FRANKLIN ZIMMERMAN, OF NEW HAVEN, CONNECTICUT, ASSIGNOR TO FLORA EDSON BIGELOW, OF DETROIT, MICHIGAN

FILTERING DEVICE

Application filed January 23, 1928. Serial No. 248,576.

This invention relates to filtering devices and particularly to a type thereof suitable for use in the fuel systems of internal combustion engines, the principal object being the provision of a new and novel construction in which the foreign matter is more easily separated out from the liquid being filtered than in conventional constructions, and in which the liquid entering the filter is prevented from stirring up any accumulation of foreign matter that may be present in the filter.

Another object is to provide a filtering device in which a filtering element is positioned in approximately parallel relationship with respect to the incoming stream of liquid to be filtered and in which a baffle is positioned in the path of movement of the incoming liquid.

Another object is to provide a filtering device comprising a vertically extending filtering element provided with a baffle adjacent the bottom thereof, the baffle being provided with an opening therein discharging into a sediment chamber below the same, the liquid being introduced into the element in a downwardly direction so that it is impinged upon the baffle.

A further object is to provide a filtering device comprising a casing enclosing a conically shaped vertically disposed filtering element, and apertured baffle being provided adjacent the bottom of the same and spaced from the bottom of the case, a duct being provided within the filtering element for directing the incoming fluid against the baffle where its force will be broken, and then flowing upwardly with a decreased velocity will pass through the filtering element and be discharged through an outlet opening positioned a material distance above the baffle, any foreign matter being carried by the liquid being either separated out by contact of the liquid with the baffle, or be conveyed by gravity from the filtering element to the baffle, the natural tendency of the stream of liquid entering the filter being to wash foreign matter on the baffle through the aperture therein and into the sediment chamber below the same where it is protected from disturbance.

The above being among the objects of the present invention the same consists in certain features of constructions and combinations of parts to be hereinafter described with reference to the accompanying drawings, and then claimed, having the above and other objects in view.

In the accompanying drawings,

Fig. 1 is a partially broken vertical sectional view taken centrally through a filtering device constructed in accordance with the present invention.

Fig. 2 is a sectional view taken on the line 2—2 of Fig. 1.

Fig. 3 is a fragmentary side elevation of the baffle and filtering element taken on the line 3—3 of Fig. 1.

In the conventional types of filtering devices and particularly those applicable to the filtering of fuel for internal combustion engines, the constructions are usually such that the fuel entering the devices is directed into direct contact with the filtering element, and are also such as to invariably allow any sediment or water that may be trapped therein to be stirred up by the incoming fuel therewith. When this is the case it often happens that the sediment and water in being driven against the filtering element by the flow of fuel is either forced through the same, thereby defeating the purpose of the device, or is caught and held by the element in such a manner as to cause a clogging of the same. The present invention provides a construction in which no direct stream of fuel entering the device comes in contact with the filtering element but instead is directed against a fixed baffle, and provides a sediment chamber so positioned with respect to the filtering element and communicating with the liquid therein by relatively small aperture in the baffle, that the tendency of the liquid entering the device is to wash the sediment through the aperture and into the sediment chamber which thereafter prevents it from being disturbed and carried into contact with the filtering element.

A suitable embodiment of my new device is shown in the accompanying drawings and comprising a sectional casing or housing having an upper cup-shaped "half" 10 and lower cup-shaped "half" 11, the halves 10 and 11 being shown as provided with interconnecting means in the form of radial flanges 12 and 13, respectively at their open ends, which are joined together by bolts 14 and nuts 15 or by other suitable means. A baffle member having a generally cylindrical or other circular-section portion 16 and radial flange 17 is preferably secured in position within the casing by clamping the flange 17 between the flanges 12 and 13 of the casing halves with suitable gaskets such as 18 and 19 on either side of the same, the cylindrical portion 16 projecting downwardly from the casing joint. To complete a unitary filtering and baffle organization, a frustro-conical filtering element 20 which may be of fine mesh screen, as shown, or other suitable material, may include a cylindrical portion adapted to interfit and to be secured at its lower edge preferably by soldering in contact with the inner surface of the cylindrical portion 16 of the baffle element and extends upwardly therefrom in converging relationship towards the top of the casing where it is secured to the collar member 21. The lower end of the portion 16 of the baffle is preferably formed at a slight angle to the horizontal as shown and is substantially closed by a bottom element 22 which is secured thereto, in a manner favorable to accumulation and guidance of sediment, this element 22 preferably being not only slightly inclined but slightly trough shaped and being spaced from the lower edge of the portion 16 at the lowest point thereon so as to provide an opening 23 leading in to that portion of the casing below the baffle which serves as a sediment chamber 27. A conventional fitting such as 24 may be provided in the top of the upper casing half 10 for receiving the tube 25 through which the liquid to be filtered is introduced into the device. The tube 25 is preferably extended down through the top of the casing half 10 where it is relatively closely but slidably received by the collar member 21 and terminates at a point extending well into the filtering element 20 and centrally disposed with relation thereto. Another fitting 26 is provided in the side of the upper casing half 10, preferably at a point a material distance above the baffle member, for conducting the liquid from the filtering device. If desired, instead of extending the inlet tube 25 into the interior of the filter element 20 as shown, it may be terminated within the fitting 24 and a separate tube be provided secured either to the fitting 24 or to the casing half 10 for effecting a continuation of the tube 25, as shown, to a point well within the filtering element 20.

In operation the liquid entering the tube 25 is discharged from the lower end thereof against the bottom wall 22 of the baffle, any foreign matter such as sediment or water being carried thereby having a tendency to be separated out by the impact against the wall 22 and be washed down the same through the opening 23 and discharged into the sediment chamber 27. The force of the liquid entering through the pipe 25 is broken by contact with the baffle and the liquid thereafter flows upwardly at a relatively low velocity and is carried through the filtering element 20 where any water or sediment which has not been separated out at the baffle is caught by the filtering element 20 and the clean liquid is discharged through the fitting 26. Because of the relatively slow velocity of all the liquid coming in contact with the filtering element 20, which is due to the fact that the walls of the filtering element are substantially parallel to the incoming stream of liquid so as to prevent direct contact of the incoming stream with the filtering element and the fact that the force of the incoming stream is broken by the baffle, there will not be a sufficient force in the liquid flowing through the element 20 to carry any sediment or water through the same as so often happens in the conventional forms of filters. In addition, because of the fact that the walls of the filter taper inwardly and upwardly, any sediment that might happen to collect on the interior walls of the filtering element will be free to be affected by the force of gravity and will have a natural tendency to move downward and collect on the lower plate 22 of the baffle, where the natural tendency of the liquid impinging against the same from the tube 25 will be to wash it through the opening 23 and deposit it in the sediment chamber 27 where it is protected from any movement of the liquid entering the filter and, therefore, cannot be sufficiently disturbed as to again bring it up into contact with and mix with the liquid within the filtering element 20. If desired one or more additional apertures such as 28 may be provided in the bottom plate 22 as shown to aid the passage of the sediment and water through the same into the sediment chamber 27, but in general I find that if the bottom plate 22 is positioned on an angle as shown and is formed slightly trough shaped as indicated in Fig. 3, the opening 23 will be sufficient for all practical purposes.

Any sediment that may collect in the chamber 27 may be easily removed from the device by removing the plug 29 whereupon any liquid within the device will flow out through the opening 30 and carry any accumulated sediment or water with it.

In the preferred embodiment of this device I prefer to form the baffle including the portions 16 and 17 and 22, the filtering element 20 and the collar 21 as a unit insertable in and removable from the device as such. In some cases it may be advisable to replace the lower end of the tube 25 with a short tube secured to the collar member 21 and formed as an integral part of the above described unit, in which case it would be preferable to provide a gasket between the upper face of the collar member 21 and the upper housing half 10 to take the place of the seal shown between the collar member 21 and tube 25. Other forms of baffles may be substituted for the particular form shown and may be supported in other manners without materially altering the present invention as long as they are positioned in the path of the stream of liquid entering the device so as to break the force of such stream, and the shape of the casing may be varied to suit individual tastes or desires. Further, if it is so desired, either the upper casing half 10 or the lower casing half 11, or both, may be formed of glass so that the action of the liquid within the same and accumulation of sediment and water may be visible, without materially changing the present invention. It is also evident that although the present device has been described with particular reference to the filtration of fuels, the construction is equally applicable to the filtration of any liquids.

Formal changes may be made in the specific embodiment of the invention described without departing from the spirit or substance of the broad invention the scope of which is commensurate with the appended claims.

What I claim is:

1. In a filtering device, a casing comprising an upper part having an outlet opening and a lower part, a baffle element secured between said parts and dividing the interior thereof into a pair of chambers connected by a restricted opening in said element, a filtering element carried by said baffle element extending from said baffle element in an upwardly direction, and means for directing liquid entering said casing centrally of said filtering element and into direct contact with said baffle element.

2. In a filtering device, a casing, a baffle element positioned between the top and bottom of said casing and dividing the interior thereof into a pair of chambers, said element cutting off the lower portion of said casing from material disturbance from liquid circulating above it and being provided with an opening adjacent one edge thereof connecting said chambers, a tube extending downwardly and centrally of said casing for directing liquid entering said casing into direct contact with said element, and a filtering element secured to and carried by said baffle extending upwardly and inwardly therefrom and detachably engaging said tube, said casing being provided with an outlet opening above said baffle element and between the upper and lower limits of said filtering element, and said baffle and said filter being provided with interfitting cylindrical portions.

3. In a filtering device, in combination, a pair of cup shaped members secured together at their open ends to form a casing, a unitary filtering and baffle member secured in position within said casing by having a portion thereof clamped between said members, said unitary member comprising an upwardly and inwardly extending filtering member closed at its lower end by a baffle member closing off communication between the upper and lower portions of said casing except through one or more openings of limited area, a fuel inlet passage extending through said unitary member and discharging downwardly therein, and an outlet passage in the upper of said cup shaped members exterior to said filtering member.

4. In a filtering device, in combination, a separate housing forming a chamber therein, a fuel inlet passage in the top of said housing extending downwardly into said chamber and terminating a material distance below the upper wall thereof, a unitary filtering and baffle organization within said chamber, said unitary organization comprising a baffle member which provides a bottom element that is slightly inclined from the horizontal and is disposed favorably to a direct reception and lateral guidance of descending sediment, and to a cutting off the upper portion of said chamber from the lower portion thereof except through one or more openings of limited area, and said filtering member comprising a frusto-conical shell of filtering material secured to said baffle member adjacent its base and extending upwardly therefrom and embracing said passage, and an outlet passage exterior to said shell located between the top and bottom limits of said shell.

5. In a filtering device, in combination, a pair of cup-shaped members secured together at their open ends to form a chamber, a unitary baffle and filtering device within said chamber, said device comprising a baffle member cutting off the upper portion of said chamber from communication with the lower portion thereof except through one or more openings of limited area, a flange on said baffle member clamped between the adjacent faces of said cup-shaped members for supporting said device in said chamber, and a frusto-conical filtering member secured adjacent its base to said baffle member and extending upwardly therefrom and bearing against the upper wall of said chamber, an inlet passage terminating within said filtering element, and an outlet passage exterior to said filtering element.

6. In a filtering device, in combination, a chamber, a fuel inlet passage discharging downwardly into said chamber, a baffle member separating said chamber into an upper and lower portion, said baffle member having a wall inclined downwardly toward one side of said chamber throughout its width in one direction and inclined downwardly toward its diametric center line in the opposite direction, an opening in said baffle at the lowest portion thereof, an outlet passage above said baffle, and a filtering element between said inlet and outlet passages.

7. In a filtering device, in combination, a chamber, a fuel inlet passage discharging downwardly into said chamber, a baffle member separating said chamber into an upper and lower portion, said baffle member having a wall inclined downwardly toward one side of said chamber throughout its width in one direction and inclined downwardly toward its diametric center line in the opposite direction, an opening in said baffle at the lowest portion thereof and a plurality of other openings of limited area in said inclined wall, an outlet passage above said baffle, and a filtering element between said inlet and outlet passages.

8. In a filtering device, in combination, a chamber, a transverse baffle in said chamber dividing said chamber into an upper and a lower portion, the lower wall of said baffle being inclined to the horizontal and being provided with an opening adjacent its lowest point providing limited communication between said portions, a frusto-conical screen having its large end secured to said baffle projecting upwardly therefrom in concentric relation with respect to said chamber, an inlet passage extending down through the top of said chamber and concentric therewith terminating within said screen approximately midway between the top of said chamber and said baffle, and an outlet passage in said chamber exterior to the said screen.

9. In a liquid filtering device, in combination, a two part casing, a separating member in said casing closing off liquid in the lower portion thereof from substantial influence of liquid circulation in the upper portion thereof and provided with a passage of limited area for the descent of sediment therethrough, means for directing liquid downwardly into said casing, a filtering element in said casing shaped to interfit with and be supported by said separating member and to provide an unfiltered body of liquid of gradually increasing cross-sectional area into which said liquid is discharged by said means, and an outlet for said casing exterior to said element, said separating member being secured by interposition of a peripheral part thereof between parts of said casing.

10. In a liquid filtering device, in combination, a sectional casing, a separating member secured between sections of said casing and closing off liquid in the lower portion thereof against material disturbance by circulation of liquid in the upper portion thereof and provided with a passage of limited area therethrough, means for directing liquid downwardly into said casing, means for conducting liquid from said casing at a point approximately midway between said separating member and the top of said casing, and a filtering element, supported by an interfitting of a part thereof with a part of said member disposed concentrically of said casing between said separating member and said top of said casing and between said inlet and outlet means whereby said liquid in passing between said means will have an outward movement relative to said filtering element.

11. In a filter, in combination, a casing, a conical filtering element disposed therein, and an inlet passage comprising a tube extending downwardly into said casing and terminating approximately midway between the top and bottom of said filtering element, said casing being provided with an outlet opening located on approximately the same level as the lower end of said tube.

12. In a liquid filtering device, in combination, a casing comprising flanged sections, one of said sections having an inlet opening in the top thereof and an outlet opening, a tubular part extending said inlet opening downwardly into the interior of said casing, a filtering element surrounding said part, and a baffle element closing off the lower end of said casing against material disturbance by liquid circulating above it, said baffle being positioned below said tubular part and in the path of flow of liquid flowing out of it, and said baffle element and said filtering element being provided with interfitting circular-section parts and one of said elements being provided with a flange disposable between the flanges of the casing sections, said elements forming a unitary assemblage insertable in and removable from such casing as such upon the separation of the flanges of the casing section.

13. In a liquid filtering device, in combination, a casing comprising flanged sections and having an inlet passage discharging in a downwardly direction into said casing at a point spaced from the top and bottom thereof, and an inclined and trough-shaped apertured transverse baffle in said casing below said inlet passage and positioned in the direct path of flow of liquid therefrom, said baffle element substantially closing off the lower portion of said casing whereby to protect the liquid thereunder against material disturbance of liquid circulating thereabove, and a filtering element within said casing slidably embracing said passage and positioned out of the direct path of flow of liquid from said passage, said element being secured to said baffle whereby to form therewith a unitary assemblage, said casing being provided with an outlet opening above said baffle, and one of the elements of said assemblage being provided with a flange interposable between the flanges of said casing sections.

14. In a filtering device: an upper and a lower casing section, said sections being provided with means for a separable interconnection thereof and said upper section being provided with an inlet and an outlet; and a unitary interior organization comprising not only a baffle element and a filter element but a supporting flange releasably retained by said interconnecting means,—said baffle element being provided with a slightly inclined and slightly trough shaped bottom which is disposed in a sediment-receiving and guiding relationship to said filter element and is provided with a restricted opening at the lowest point thereof, leading into that portion of said casing below said baffle element.

BENJAMIN FRANKLIN ZIMMERMAN.